United States Patent
Haase et al.

(10) Patent No.: US 10,183,592 B2
(45) Date of Patent: *Jan. 22, 2019

(54) EXHAUST AIR GUIDE OF A FUEL CELL STACK IN A MOTOR VEHICLE

(71) Applicant: Bayerische Motoren Werke Aktiengesellschaft, Munich (DE)

(72) Inventors: Stefan Haase, Schwabhausen (DE); Andreas Buchner, Steinebach (DE); Michael Bauer, Unterfoehring (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 582 days.

This patent is subject to a terminal disclaimer.

(21) Appl. No.: 14/587,071

(22) Filed: Dec. 31, 2014

(65) Prior Publication Data

US 2015/0111123 A1 Apr. 23, 2015

Related U.S. Application Data

(63) Continuation of application No. PCT/EP2013/061742, filed on Jun. 6, 2013.

(30) Foreign Application Priority Data

Jul. 2, 2012 (DE) .......... 10 2012 211 421

(51) Int. Cl.
*H01M 8/04* (2016.01)
*B60L 11/18* (2006.01)
(Continued)

(52) U.S. Cl.
CPC ....... *B60L 11/1892* (2013.01); *B60L 11/1898* (2013.01); *H01M 8/04014* (2013.01);
(Continued)

(58) Field of Classification Search
CPC ......... H01M 8/04074; H01M 8/04014; H01M 8/04097; H01M 8/04716; H01M 2250/20
See application file for complete search history.

(56) References Cited

U.S. PATENT DOCUMENTS

| 4,362,789 A | 12/1982 | Dighe | |
|---|---|---|---|
| 5,981,096 A * | 11/1999 | Hornburg | H01M 8/04186 |
| | | | 429/410 |

(Continued)

FOREIGN PATENT DOCUMENTS

| CN | 101903244 A | 12/2010 |
|---|---|---|
| DE | 10 2004 049 623 A1 | 4/2006 |

(Continued)

OTHER PUBLICATIONS

International Search Report (PCT/ISA/210) dated Jan. 29, 2014, with English translation (Seven (7) pages).

(Continued)

*Primary Examiner* — Jonathan Crepeau
*Assistant Examiner* — Angela J Martin
(74) *Attorney, Agent, or Firm* — Crowell & Moring LLP

(57) ABSTRACT

An exhaust-air guide of a fuel cell stack having a cooling structure, in particular in a motor vehicle, is provided. The cooler structure belongs to the functional environment of the fuel cell stack and is in form through which ambient air flows. The exhaust air of the fuel cell stack is guided to a point upstream of the cooler structure such that the exhaust air flows through the cooler structure in a throughflow direction and, in so doing, entrains ambient air in accordance with the jet pump principle. The exhaust air of the fuel cell stack may be cooled before being guided to the cooler structure. The exhaust air of the fuel cell stack is guided to a point upstream of the cooler structure in multiple pipes that are oriented at least approximately parallel to the inflow surface of the cooler structure, from which pipes the exhaust (Continued)

air emerges via outlet openings in the pipe wall. The outlet openings are situated at a suitable angle with respect to the throughflow direction.

7 Claims, 1 Drawing Sheet

(51) Int. Cl.
| | |
|---|---|
| *H01M 8/04007* | (2016.01) |
| *H01M 8/04089* | (2016.01) |
| *H01M 8/04014* | (2016.01) |
| *F28D 21/00* | (2006.01) |
| *H01M 8/04701* | (2016.01) |

(52) U.S. Cl.
CPC ... *H01M 8/04074* (2013.01); *H01M 8/04097* (2013.01); *F28D 2021/0043* (2013.01); *H01M 8/04716* (2013.01); *H01M 2250/20* (2013.01); *Y02T 90/32* (2013.01); *Y02T 90/34* (2013.01)

(56) References Cited

U.S. PATENT DOCUMENTS

| | | | |
|---|---|---|---|
| 6,276,473 B1 * | 8/2001 | Zur Megede | B60K 1/04 180/65.25 |
| 7,686,111 B2 | 3/2010 | Koenekamp et al. | |
| 8,216,737 B2 | 7/2012 | Sommer et al. | |
| 8,371,522 B2 | 2/2013 | Piesker | |
| 9,267,415 B2 * | 2/2016 | Myers | F01N 5/02 |
| 2004/0121199 A1 * | 6/2004 | Balan | H01M 8/04022 429/415 |
| 2007/0243440 A1 * | 10/2007 | Schlerf | F02G 5/02 60/285 |
| 2008/0057372 A1 | 3/2008 | Sommer et al. | |
| 2008/0196956 A1 | 8/2008 | Koenekamp et al. | |
| 2008/0289323 A1 * | 11/2008 | Diez | F01N 13/102 60/323 |
| 2012/0079820 A1 * | 4/2012 | Neugebauer | F01N 5/025 60/320 |
| 2013/0004866 A1 | 1/2013 | Gerhardt et al. | |
| 2013/0139997 A1 | 6/2013 | Murakami et al. | |

FOREIGN PATENT DOCUMENTS

| | | |
|---|---|---|
| DE | 10 2008 009 118 A1 | 9/2008 |
| DE | 10 2007 061 994 A1 | 7/2009 |
| DE | 10 2008 029 529 A1 | 10/2009 |
| DE | 10 2009 032 601 A1 | 1/2011 |
| DE | 10 2012 206 459 A1 | 10/2013 |
| JP | 7-29587 A | 1/1995 |
| JP | 2002-184419 A | 6/2002 |
| WO | WO 2010/066462 A1 | 6/2010 |
| WO | WO 2011/098279 A1 | 8/2011 |
| WO | WO 2012/014568 A1 | 2/2012 |

OTHER PUBLICATIONS

German Search Report dated Aug. 13, 2012, with English translation (Ten (10) pages).

Chinese Office Action issued in counterpart Chinese Application No. 201380034563.6 dated Apr. 29, 2016 with English translation (11 pages).

European Office Action issued in counterpart European Application No. 13 727 198.7 dated Jun. 7, 2017 (five pages).

* cited by examiner

US 10,183,592 B2

EXHAUST AIR GUIDE OF A FUEL CELL STACK IN A MOTOR VEHICLE

CROSS REFERENCE TO RELATED APPLICATIONS

This application is a continuation of PCT International Application No. PCT/EP2013/061742, filed Jun. 6, 2013, which claims priority under 35 U.S.C. § 119 from German Patent Application No. 10 2012 211 421.1, filed Jul. 2, 2012, the entire disclosures of which are herein expressly incorporated by reference.

BACKGROUND AND SUMMARY OF THE INVENTION

The invention relates to the exhaust-air guide of a fuel cell stack, in particular in a motor vehicle, having a cooling device, which belongs to the functional environment of the fuel cell stack, in the form of a cooler structure through which ambient air flows. With regard to the prior art, reference is made by way of example to DE 10 2008 029 529 A1.

Fuel cells, at least those of PEM type of construction, must be cooled during operation. For this reason, a suitable cooling device must be provided for a so-called fuel cell stack formed by a stack of multiple individual fuel cells. Such a cooling device is normally formed by a circuit for a heat carrier medium and a heat exchanger in which circulated heat carrier medium that absorbs heat in the fuel cell stack releases said absorbed heat energy to an ambient air stream conducted through the heat exchanger, the latter being referred to in the present case in generalized form as a cooler structure. Air-cooled fuel cell stacks are, however, also known, which themselves form or comprise a suitable cooler structure past which or through which an ambient air stream is conducted for cooling purposes; in this regard, confer for example the German patent application with the file reference 10 2012 206 459.1, which reference does not constitute a prior publication. In most cases, for the delivery of the ambient air stream through the cooler structure—be it an independent heat exchanger or a cooler structure integrated in the fuel cell stack—an independent delivery device (blower, fan, etc.) is required which, in part, has a relatively high energy requirement.

A problem addressed by the present invention is that of specifying an improvement in this regard.

The solution to the problem consists in an exhaust-air guide of a fuel cell stack, in particular in a motor vehicle, having a cooling device, which cooling device belongs to the functional environment of the fuel cell stack and which is in the form of a cooler structure through which ambient air flows. The exhaust air of the fuel cell stack is guided to a point upstream of the cooler structure such that the exhaust air flows through the cooler structure in a throughflow direction and, in so doing, entrains ambient air in accordance with the jet pump principle.

According to the invention, the exhaust air of the fuel cell stack—in the case of PEM fuel cells, this is the cathode exhaust-air stream—is at least partially conducted through the cooler structure, wherein the pressure or positive pressure of the exhaust-air stream is utilized for the delivery of ambient air (as cooling air). According to the invention, for this purpose, the exhaust-air stream (or at least a part of the same) is guided to the cooler structure such that, as it enters the cooler structure and subsequently flows through the same, it draws or entrains further ambient air into the cooler structure. In this respect, the present invention utilizes the fundamentally known jet pump principle (known, in particular, from a suction jet pump formed by a suitable pipe junction). It is expressly pointed out here that, at a cooler structure, it is by no means necessary for the fuel cell exhaust air and the ambient air to be conducted in a pipe junction to a point upstream of the cooler structure, or into the cooler structure; rather, it is adequate for the exhaust air of the fuel cell stack to be suitably guided to a point upstream of the cooler structure, for example in multiple pipes that are oriented at least approximately parallel to the inflow surface of the cooler structure, from which pipes the exhaust air emerges via outlet openings in the wall of the pipes ("pipe wall"). The outlet openings are situated at a suitable angle with respect to the throughflow direction of the (desired) cooling air stream through the cooler structure. It is always possible in the proposed way for the pressure potential that exists in the exhaust-air stream of the fuel cell stack to be utilized for the delivery of ambient air and thus of cooling air through the cooler structure.

As regards the fuel cell exhaust air or the exhaust-air stream, the pressure potential or positive pressure thereof results from the prior delivery of ambient air, as reaction air, into the fuel cell stack. The ambient air reacts there in a known manner at one of the electrodes—in the case of a PEM fuel cell, at the cathode—with the fuel stream (in particular in the form of hydrogen) that is guided to the other side of the respective cathode-electrolyte-anode unit, before the ambient air is subsequently discharged from the fuel cell stack as an exhaust-air stream. Normally, the temperature and, in particular, the moisture content of the fuel cell stack exhaust air is elevated in relation to the ambient air that is initially supplied as reaction air to the fuel cells. In one advantageous refinement of the invention, it may therefore be provided that, according to the invention, before being guided to the cooler structure, the exhaust air of the fuel cell stack is cooled in a suitable heat exchanger (preferably again with the aid of ambient air), with moisture advantageously being condensed out, such that the exhaust-air stream of the fuel cell stack does not give rise to mist formation, such as is otherwise normally observed.

In one advantageous refinement of the present invention, the inflow direction and/or the inflow speed of the fuel cell exhaust air relative to the cooler structure, and thus for example the outflow direction and/or the outflow speed of the exhaust air from the pipes and generally from any system via which the fuel cell exhaust air is guided, in the manner according to the invention, to a point upstream of the cooler structure, may be variable in targeted fashion. For example, for this purpose, the outlet openings in the pipe wall of the pipes may be variable by use of a slide or similar. For example, by way of slides, the cross-sectional area of the outlet openings can be varied, giving rise to different outflow speeds for the fuel cell exhaust-air stream; it is however also possible by way of slides or the like for the inflow angle at which the fuel cell exhaust-air stream impinges on the cooler structure to be varied. In the case of the pipes, mentioned by way of example, through which the fuel cell exhaust air is guided to a point upstream of the cooler structure, it is however also possible for the pipes themselves to be rotated about their longitudinal axis, and thus for the inflow direction of the exhaust-air stream relative to the cooler structure to be varied. If multiple pipes are provided through which the fuel cell exhaust air is conducted to a point upstream of the cooler structure, it is also possible, in a manner dependent on a wide variety of boundary conditions, for some of the pipes to be deactivated, so to speak, that is to say not charged with fuel cell exhaust air, whereby the entire exhaust-air stream is distributed over a smaller number of pipes and thus the flow speed of the exhaust-air stream in the smaller number of pipes is increased.

At this juncture, it is expressly pointed out that it is by no means necessary, as is optionally proposed, for the fuel cell exhaust air to be guided to the air inflow side of the cooler structure via multiple pipes with outlet openings provided in the pipe wall; rather, it is also possible for other air guidance systems to be used for this purpose.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
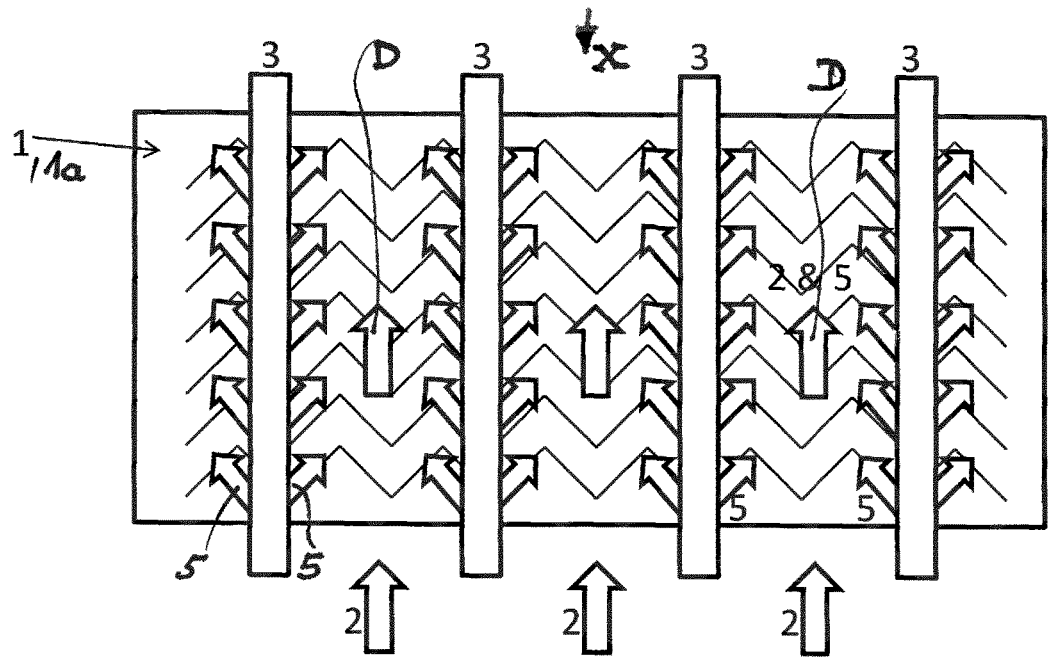
FIG. 1 is a diagrammatic view of an exemplary exhaust air guide of a fuel cell stack.
Figure 2:
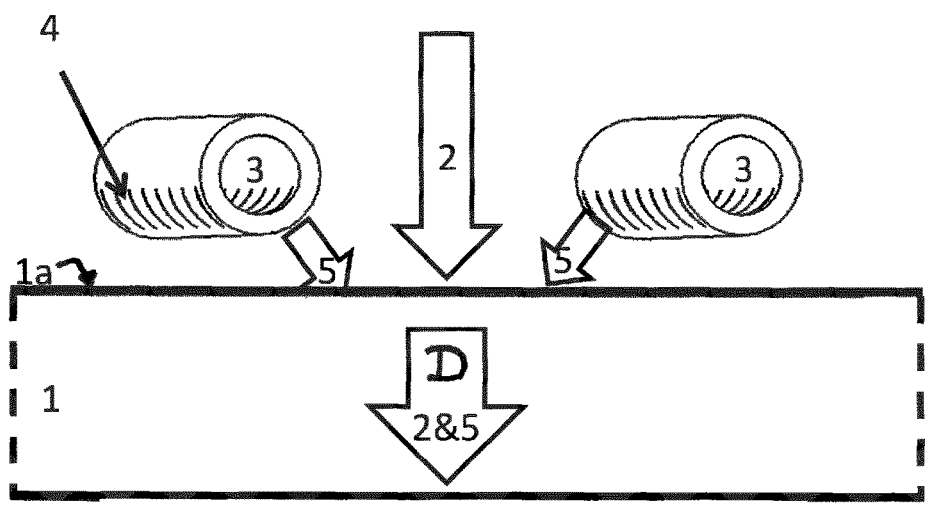
FIG. 2 is a diagram illustrating a detail view X from FIG. 1.

An exemplary embodiment of the invention is shown, wherein FIG. 1 diagrammatically shows the view of an exhaust-air guide upstream of a face side of a cooler structure (in a frontal view of the latter), and FIG. 2 illustrates a detail view X from FIG. 1. Here, the illustrations do not show a fuel cell stack per se, and likewise do not show a motor vehicle, in particular a passenger motor vehicle, in which there is installed a fuel cell stack and a cooler structure. Here, the cooler structure is denoted by the reference sign 1, the cooler structure being for example in the form of a substantially conventional air-water heat exchanger such as is installed, in the form of a "cooler" or "radiator" for cooling an internal combustion engine which functions as a "modern" motor vehicle drive unit, in a wide variety of embodiments in motor vehicles, in particular in the front region thereof, where the cooler structure 1 is impinged on particularly effectively by the relative wind of the moving motor vehicle.

Ambient air can flow, as per the arrows 2 (see, in particular, FIG. 2), in the throughflow direction D through the cooler structure 1, and in so doing can absorb heat from a heat carrier medium (not shown; preferably water containing an antifreeze agent) which is likewise conducted through the cooler structure 1 so as to exchange heat with the ambient air 2 (the reference numeral 5 also denotes the fuel cell exhaust air itself). In FIG. 1, the illustrated arrows 2, 5 and D should correctly be perpendicular to the plane of the drawing; merely for a simplified illustration, said arrows 2, 5 and D are illustrated as lying in the plane of the drawing.

In order that ambient air 2 can flow through the cooler structure 1 as illustrated, the latter is of fundamentally known construction, though for simplicity, this is not illustrated in detail in the present figures; the cooler structure 1 is formed substantially by a multiplicity of suitably arranged pipes in which the heat carrier medium flows and on which there are provided a multiplicity of fins over which the ambient air 2, as cooling air, flows.

The figures illustrate multiple pipes 3 which run in front of the face surface or inflow surface 1a of the cooler structure 1 at the inflow side for the ambient air 2 and substantially parallel to the face surface or inflow surface. The pipes in the present case are oriented vertically, though some other configuration may also be provided. The pipes 3 are illustrated in a slightly perspective or oblique view in FIG. 2 for improved clarity.

The pipes 3, which are also supplied in parallel with the medium to be guided, specifically the exhaust-air stream of the fuel cell stack, guide the exhaust-air stream of the fuel cell stack therein, that is to say a corresponding fraction of the overall exhaust-air stream flows in each individual pipe 3. In the pipes 3 or in the pipe walls thereof, a multiplicity of outlet openings 4 are provided so as to be arranged such that a small partial stream of fuel cell exhaust air emerges from each outlet opening 4 in directed fashion so as to flow, as per arrow 5 (the reference sign 5 also denotes the fuel cell exhaust air itself), into the cooler structure 1 and thereupon through the latter as per arrow D. Owing to the pressure potential of the respective exhaust-air partial stream 5, ambient air as per arrow 2 is to a certain extent also drawn into the cooler structure 1 and through the latter as per arrow D, specifically utilizing the jet pump principle. In this way, at least a small level of delivery power is required for a delivery device (not illustrated here) for delivering an ambient air stream 2 through the cooler structure 1.

It is advantageously the case here that the fuel cell exhaust air 5 is also mixed with the ambient air 2 and thus diluted, such that even if the fuel cell exhaust air 5 is not previously cooled—as is described further above as being an option—no mist formation occurs as a result of condensation of the moisture contained in the fuel cell exhaust air 5. Not illustrated in the figures is an advantageous refinement, described further above, in which the outlet cross section and/or the outlet direction of the outlet openings 4 can be varied in targeted fashion for example by use of suitable rotary slides.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. An exhaust-air guide of a fuel cell stack, comprising:
a cooler structure of the fuel cell stack, wherein ambient air flows through the cooler structure; and
a guide for conducting exhaust air of the fuel cell stack to a point upstream of the cooler structure viewed in a flow-through direction of the ambient air through the cooler structure, the guide being configured such that the exhaust air of the fuel cell stack flows through the cooler structure in the flow-through direction, wherein
an outlet of the guide is arranged in such a way to draw the ambient air into the cooler structure via a pressure potential between the exhaust air of the fuel cell stack and the ambient air in accordance with a jet pump principle.
2. The exhaust-air guide according to claim 1, wherein the exhaust air of the fuel cell stack is cooled before being guided to the cooler structure.
3. The exhaust-air guide according to claim 2, further comprising:
multiple pipes through which the exhaust air of the fuel cell stack is guided to the point upstream of the cooler structure, wherein:
the multiple pipes are oriented at least approximately parallel to an inflow surface of the cooler structure, and
the exhaust air emerges from the multiple pipes via outlet openings formed in walls of the pipes, the outlet openings being configured at a suitable angle with respect to the flow-through direction.

4. The exhaust-air guide according to claim 3, wherein an inflow direction and/or an inflow speed of the exhaust air relative to the cooler structure is variable in a targeted manner by variably configuring the outlet openings in the pipe walls.

5. The exhaust-air guide according to claim 4, wherein a slide structure is configured to vary the outlet openings.

6. The exhaust-air guide according to claim 1, further comprising:
   multiple pipes through which the exhaust air of the fuel cell stack is guided to the point upstream of the cooler structure, wherein:
   the multiple pipes are oriented at least approximately parallel to an inflow surface of the cooler structure, and
   the exhaust air emerges from the multiple pipes via outlet openings formed in walls of the pipes, said outlet openings being configured at a suitable angle with respect to the flow-through direction.

7. The exhaust-air guide according to claim 1, wherein the exhaust-air guide of the fuel cell stack is configured as an exhaust-air guide of a motor vehicle fuel cell stack.

\* \* \* \* \*